(12) United States Patent
Getchius et al.

(10) Patent No.: US 9,858,406 B2
(45) Date of Patent: Jan. 2, 2018

(54) IMAGE-BASED USER AUTHENTICATION

(71) Applicant: Verizon Patent and Licensing Inc., Basking Ridge, NJ (US)

(72) Inventors: Jeffrey M. Getchius, Cambridge, MA (US); Guy Getchius, Wadsworth, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 14/667,037

(22) Filed: Mar. 24, 2015

(65) Prior Publication Data

US 2016/0283708 A1 Sep. 29, 2016

(51) Int. Cl.
*G06F 21/36* (2013.01)

(52) U.S. Cl.
CPC .................................. *G06F 21/36* (2013.01)

(58) Field of Classification Search
CPC ........................................................ G06F 21/36
See application file for complete search history.

(56) References Cited

U.S. PATENT DOCUMENTS

| | | | |
|---|---|---|---|
| 9,195,834 B1* | 11/2015 | Jakobsson | G06F 21/31 |
| 2004/0030934 A1* | 2/2004 | Mizoguchi | G06F 21/36 |
| | | | 726/18 |
| 2004/0205576 A1* | 10/2004 | Chikirivao | G06F 17/30917 |
| | | | 715/237 |
| 2006/0136224 A1* | 6/2006 | Eaton | G10L 21/028 |
| | | | 704/277 |
| 2009/0122198 A1* | 5/2009 | Thorn | G06K 9/00221 |
| | | | 348/715 |
| 2010/0043062 A1* | 2/2010 | Alexander | G06F 21/36 |
| | | | 726/6 |
| 2011/0249144 A1* | 10/2011 | Chang | G06F 17/30259 |
| | | | 348/231.3 |
| 2013/0138968 A1* | 5/2013 | Yudkin | G06F 21/602 |
| | | | 713/183 |
| 2014/0114984 A1* | 4/2014 | Kadyrov | G06F 21/36 |
| | | | 707/748 |
| 2016/0261583 A1* | 9/2016 | Zhang | H04L 63/083 |

* cited by examiner

*Primary Examiner* — Oleg Korsak
*Assistant Examiner* — Simon Kanaan

(57) ABSTRACT

An authenticity accuracy, corresponding to a personal identification number, is determined. A device presents a correct image (or group of images) and an incorrect image (or group of images). Selections from a user are received until a sufficient number of correct images are selected to satisfy the authenticity accuracy. For example, a counter may be incremented when the correct image is selected, and the user may be considered to be authenticated if the counter reaches a sufficient level.

20 Claims, 9 Drawing Sheets

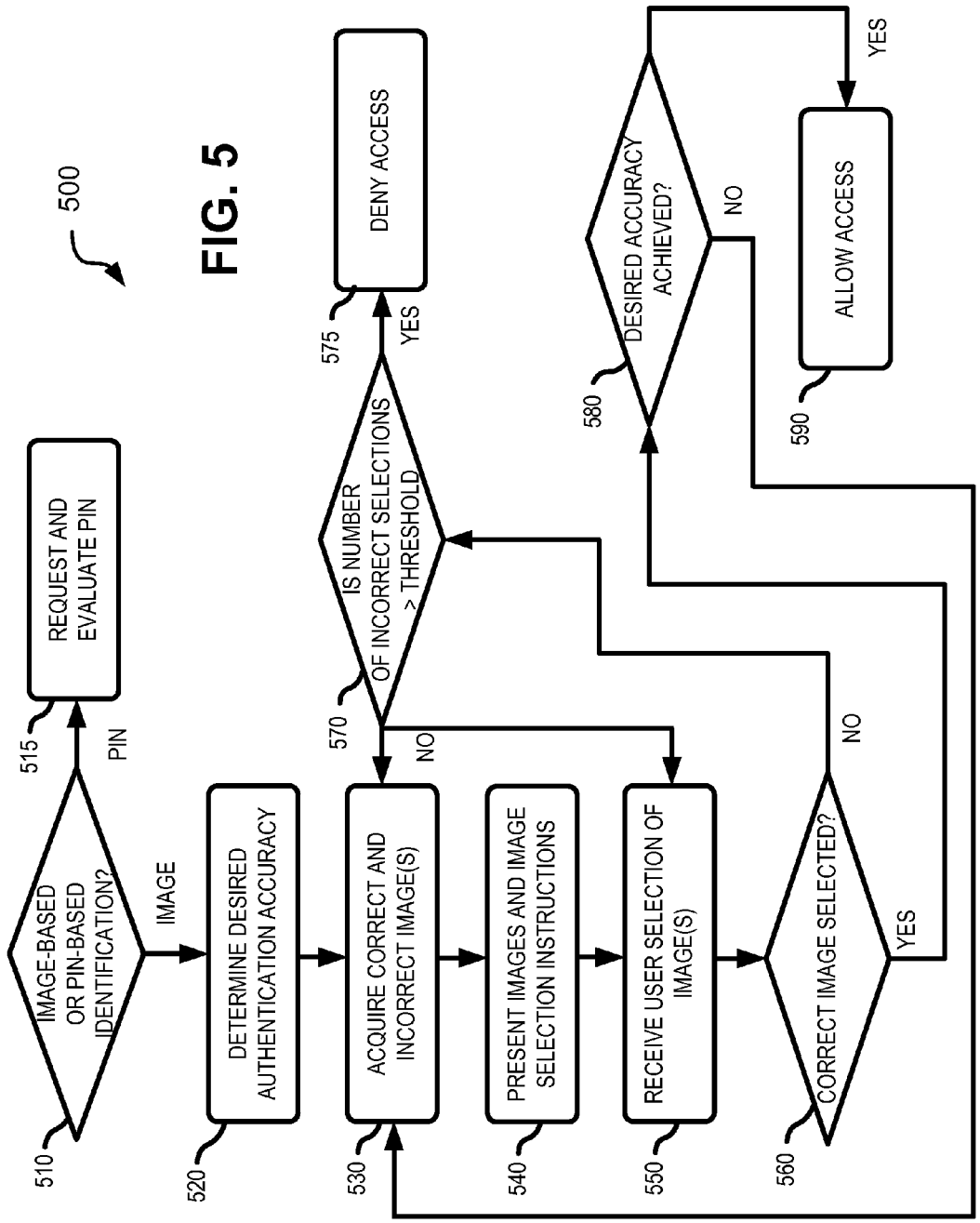

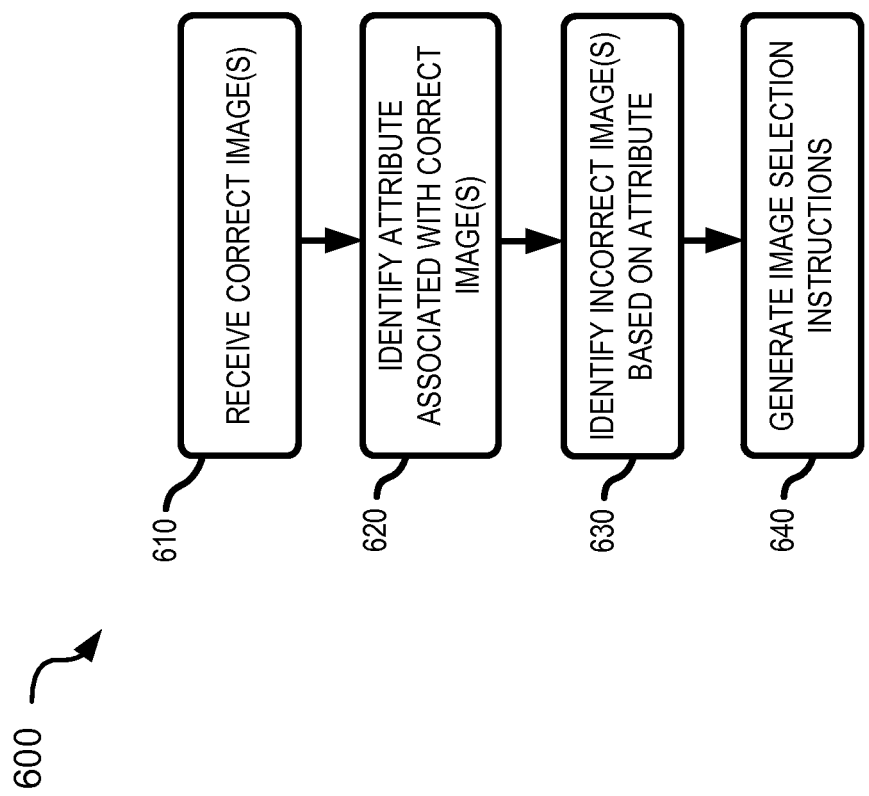

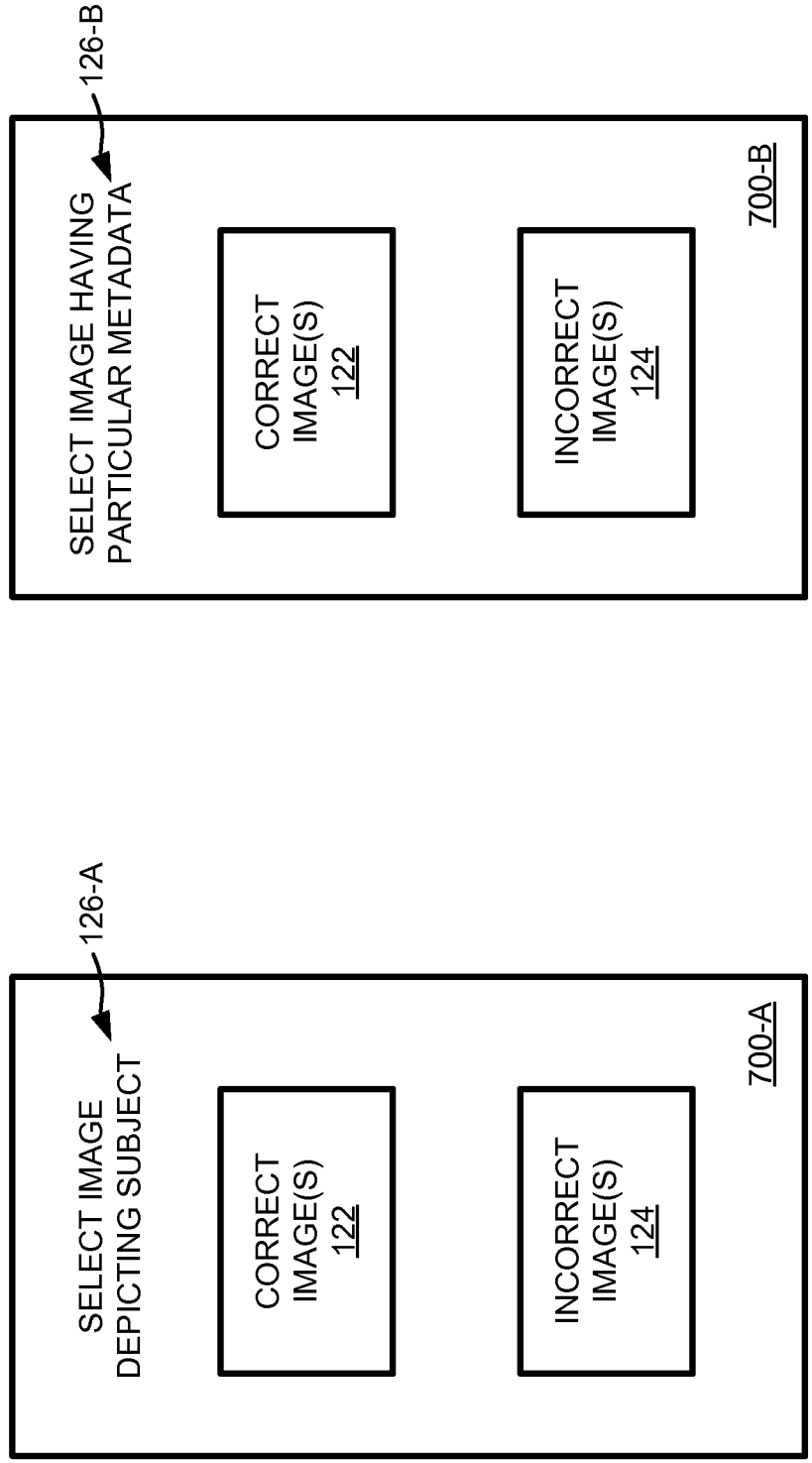

IMAGE-BASED USER AUTHENTICATION

BACKGROUND INFORMATION

A personal identification number (PIN) is a numeric password associated with a user, and the PIN may be used to authenticate the user. Typically, the user is authenticated by entering a number that matches the PIN associated with the user. The PIN may be a four-digit number in the range 0000-9999, resulting in 10,000 possible PINs, but PINs of other lengths and/or using other characters (e.g., letters and/or symbols) may be used. The user has a 0.01% ($10^{-4}$) probability of guessing a four-digit PIN with a single guess. A PIN-based verification system may allow a user to make multiple attempts, increasing the likelihood that the user will guess a correct PIN. For example, if the user is allowed three attempts to input a 4-digit PIN, the user will have a 0.03% ($3 \times 10^{-4}$) probability of correctly guessing the correct PIN.

BRIEF DESCRIPTION OF THE DRAWINGS

FIGS. 5 and 6 are flowcharts of processes for performing an image-based authentication of a user according to an implementation described herein; and FIGS. 7A-7E illustrate exemplary displays that may be presented by the user device of FIG. 1 according to implementations described herein.

DETAILED DESCRIPTION OF PREFERRED EMBODIMENTS

The following detailed description refers to the accompanying drawings. The same reference numbers in different drawings identify the same or similar elements.

Figure 1:
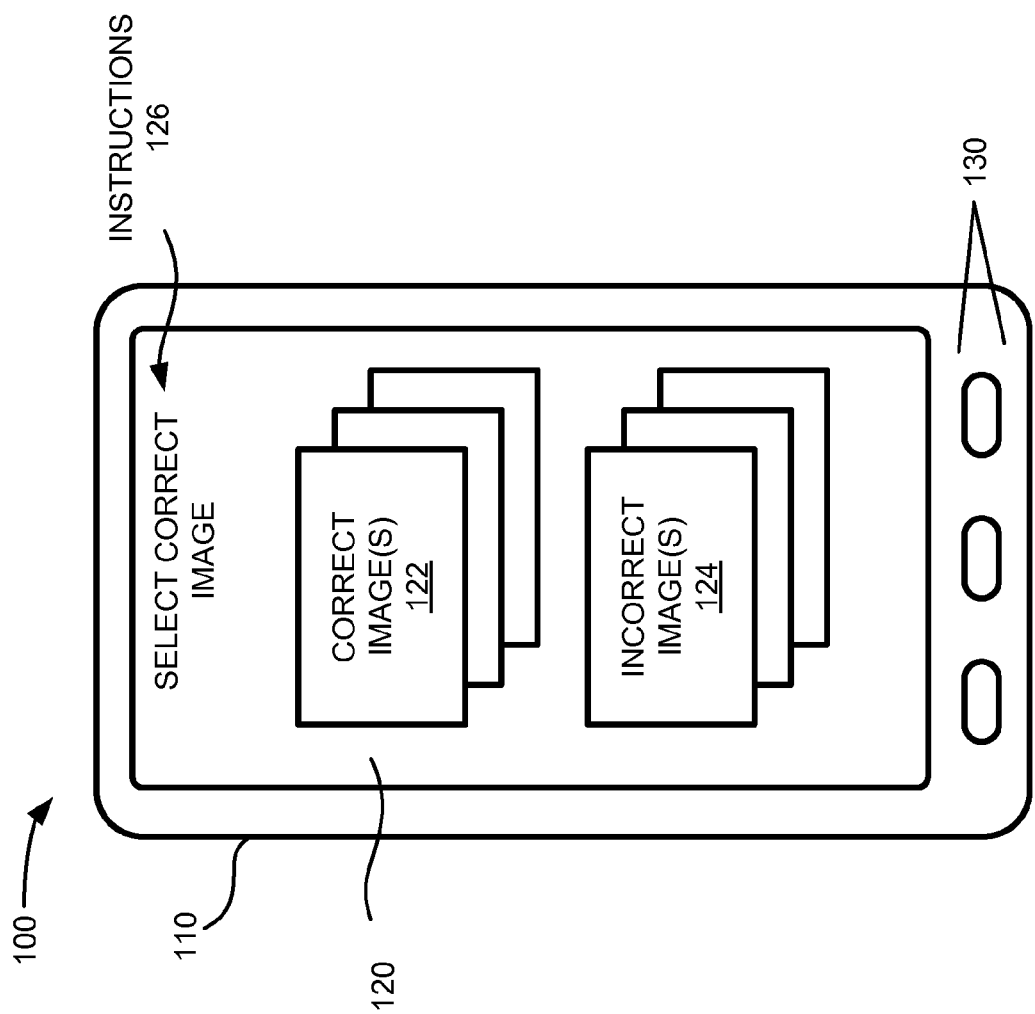
FIG. 1 shows an exemplary user device that may provide an image-based user authentication according to one implementation described herein.

FIG. 1 shows an exemplary user device 100 that may provide an image-based user authentication according to one implementation. As shown in FIG. 1, user device 100 may include a housing 110, a display 120, and one or more control buttons 130. As described herein, display 120 may present a correct image (or group of images) 122, an incorrect image (or group of images) 124, and selection instructions 126, and a user may be authenticated based on a correctly selecting the correct image (or group of images) 122.

For example, user device 100 may include a portable communication device (e.g., a mobile phone, a smart phone, a phablet device, a global positioning system (GPS) device, and/or another type of wireless device); a laptop (e.g., with a wireless air card), tablet, or another type of portable computer; a media playing device; a portable gaming system; and/or any other type of mobile computer device with communication and output capabilities. In some implementations, client device 100 may also include an application, such as a browser or a multimedia player, to allow display 120 (or a different display device) to present one or more correct images 122, one or more incorrect images 124, and/or selection instructions 126. Also, the image-based approach for authenticating a user, as described herein, may be applied to other devices, such as a point-of-sale terminal, an automated teller machine, a kiosk, etc. without a keyboard or other user interface that would enable a user to input an alphanumeric code, but permits a user to view and select a correct image 122 from a group of images that includes at least one incorrect image 124.

Housing 110 may include a chassis via which some or all of the components of user device 100 are mechanically secured and/or covered. Display 120 may include a component to receive input electrical signals and present a visual output in the form of text, images, videos and/or combinations of text, images, and/or videos which communicate visual information to a user of user device 100.

As shown in FIG. 1, display 120 may present one or more correct images 122 and one or more incorrect images 124. Correct images 122 and incorrect images 124 may be located anywhere on display 120. Display 120 may further present instructions 126 that direct a user to select correct image 122 without selecting incorrect image 124. In one implementation, instructions 126 may identify a characteristic associated with a subject of correct image 122, but is not associated with a subject of incorrect image 124. For example, instructions 126 may include an identifier (e.g., name) associated with the subject of correct image 122 and/or a relationship of the subject to the user. In another implementation, instructions 126 may identify metadata or an attribute associated with correct image 122. For example, instructions 126 may identify a time when or a location where correct image 122 was captured. Instructions 126 may change so that correct image 122 and incorrect image 124 may be reclassified. For example, instructions 126 may change to identify an attribute associated with incorrect image 124

In operation, user device 100 may receive an input from a user and determine whether the user has correctly selected correct image 122 based on instructions 126. User device 100 may authenticate the user if user correctly selects correct image 122.

In one implementation, an authentication challenge associated with the presentation of correct image 122 and incorrect image 124 on display 120 is associated with a particular probability of success, and user device 100 presents a combination of authentication challenges until a desired level of accuracy is achieved. In the following example, display 120 may present four images that include a single correct image 122 and three incorrect images 124, and the user has a $4^{-1}$ probability (25%) of randomly guessing correct image 122. In this example, if an authentication accuracy corresponding to a 4 digit pin (i.e., a 1 out of 10000, or 0.01%, probability of randomly selecting correct images 122) is desired, user device 100 may require the user to make seven consecutive successful selections of a single correct image 122 presented in connection with three incorrect images 124. In particular, and the user would have a $4^{-7}$ (0.0061%) probability of seven consecutive successive selections of correct image 122 presented in this manner.

In one implementation, display 120 may function as a touch screen and may include a component to permit data and control commands to be inputted into user device 100 via touch display 120. For example, display 120 may include a pressure sensor to detect touch for selecting content on display 120. Alternatively or additionally, display 120 may include a capacitive or field sensor to detect touch and/or proximity to display 120. Thus, a user may select correct image 122 using touch screen display 120. Additionally or alternatively, the user may select from correct image 122 using a control buttons 130. Control buttons 130 may include one or more buttons that accept, as input, mechanical pressure from the user (e.g., the user presses a control button or combinations of control buttons) and send electrical signals to a processor (not shown) that may cause user device 100 to perform one or more operations.

Although FIG. 1 depicts exemplary components of user device 100, in other implementations, user device 100 may include fewer components, additional components, different components, or differently arranged components than illustrated in FIG. 1. Furthermore, one or more components of user device 100 may perform one or more tasks described as being performed by one or more other components of user device 100.

Figure 2:
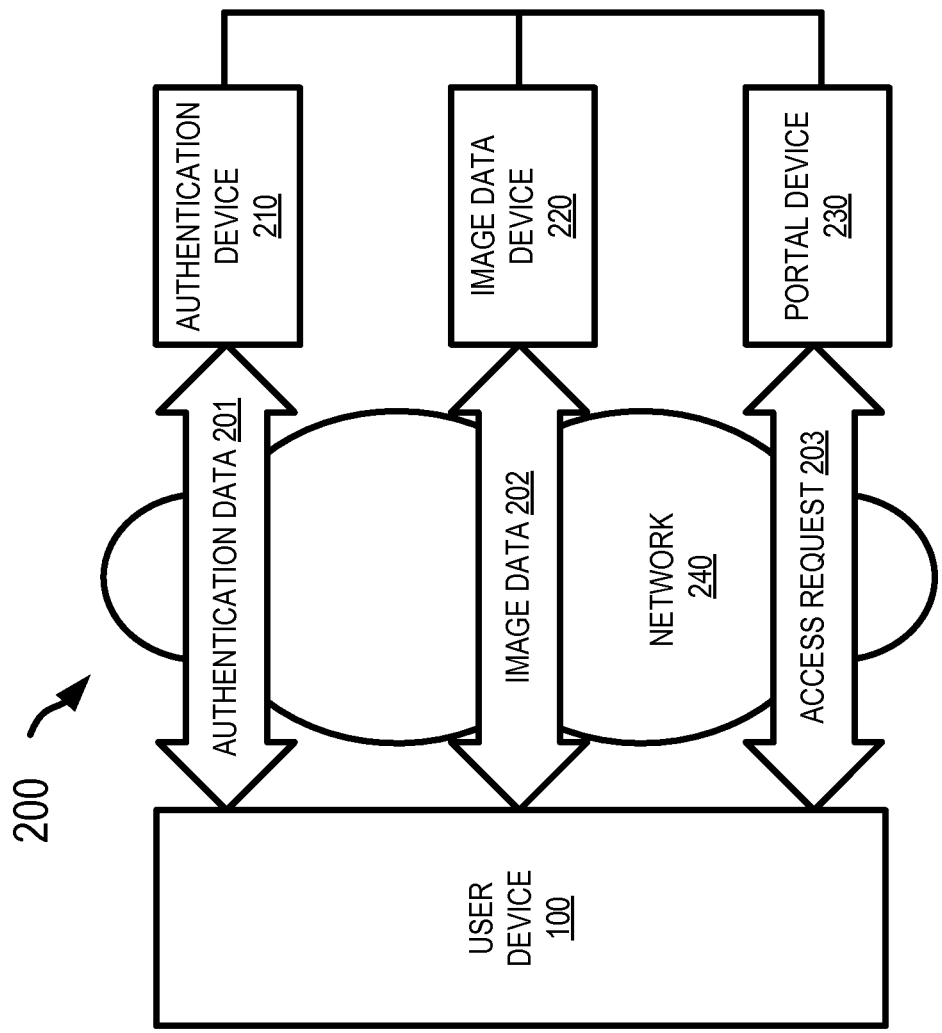
FIG. 2 is a diagram showing an exemplary environment in which the systems and/or methods, described herein, may be implemented according to one implementation described herein.

FIG. 2 is a diagram showing an exemplary environment 200 in which the systems and/or methods, described herein, may be implemented. As shown in FIG. 2, environment 200 may include user device 100, an authentication device 210, an image data device 220, a portal device 230 and/or a network 240. In one implementation, user device 100 may exchange authentication data 201 with authentication device 210 (e.g., indicating whether a user has selected correct image 122) based on image data 202 received from image data device 220, and user device 100 may use authentication data 201 to form an access request 203 to portal device 230 for requesting a service or data.

Authentication device 210 may include one or more computing devices capable of exchanging authentication data 201 with user device 100. For example, authentication device 210 may receive an identifier associated with user device 100, such as a user token, a device serial number, a telephone number, a network address, an electronic serial number (ESN), a mobile equipment identifier (MEID), or an international mobile station equipment identity (IMEI) number. Authentication device 210 may determine and forward to user device 100 an indication of a desired level of accuracy for user device 100. User device 100 may then return, in authentication data 201, an indication to authentication device 210 of whether the user correctly selected a sufficient number of correct images 122 to satisfy the desired accuracy level. Authentication device 210 may further provide data, such as a first token (or credential) that enables user device 100 to obtain image data 202 from image data device 220 and/or a second token to generate access request 203 for portal device 230.

In one implementation, authentication device 210 may further include, in authentication data 201, information identifying a characteristic associated with correct image 122, and this information may be used by user device 100 to collect image data 202 that includes correct image 122 and/or incorrect image 124 from image data device 220. User device 100 may further use this information to generate instructions 126 and/or assess a user selection from correct image 122 and/or incorrect image 124.

Image data device 220 may include one or more computing devices capable of exchanging image data 202 with user device 100. Image data 202 may include, for example, data, such as an image file, that may be used by user device 100 to present correct image (or group of images) 122 and/or incorrect image (or group of images) 124. In another example, image data 202 may include a storage location, such as a network address of a storage device (not shown) that stores correct image (or group of images) 122 and/or incorrect image (or group of images) 124. In yet another example, image data 202 may include one or more characteristics that may be used by user device 100 to select correct image 122 and/or incorrect image 124 from a pool of images, such as images captured, stored, and/or accessed via user device 100.

Portal device 230 may include one or more computing devices that are capable of allowing user device 100 to access a service, a device, an application, and/or information when access request 203 indicates that a user has successfully selected correct image 122. In one example, access request 203 may include data identifying an image selected by a user, and portal device 230 may function to determine whether the selected image corresponds to correct image 122. For example, portal device 230 may receive information identifying a characteristic of correct image 122 (e.g., from authentication device 210 and/or image data device 220), and portal device 230 may determine whether the selected image shares the identified characteristic Network 240 may include a local area network (LAN), a wide area network (WAN), a metropolitan area network (MAN), a wireless network, an optical fiber (or fiber optic)-based network, a cable television network, a satellite television network, and/or a combination of networks. In one implementation, network 240 may include an Internet Protocol (IP)-based network. In some implementations, network 240 may include a private network controlled by, for example, a telecommunications company that provides television, telephone, and/or data access to user device 100. In another implementation, network 240 may be a public network, such as the Internet, or a combination of public and private networks. Network 240 may include a closed distribution network that includes, for example, cable, optical fiber, satellite, or virtual private networks that restrict unauthorized alteration of content delivered by a service provider. For example, network 240 may correspond to a closed distribution network implemented by user device 100 and/or providing secure/encrypted network communications to user device 100.

In one implementation, network 240 may also include a network that distributes or makes available services, such as, for example, television services, mobile services, and/or Internet services. Network 240 may be a satellite-based network and/or a terrestrial-based network. In implementations described herein, network 240 may support services for a customer associated with user device 100. Network 240 may include, for example, content storage and distribution devices, customer information devices, billing devices, application devices, content information devices, security/licensing devices, advertising information devices, etc.

Although FIG. 2 shows exemplary components of environment 200, in other implementations, environment 200 may include fewer components, different components, differently arranged components, or additional components than those depicted in FIG. 2. Additionally or alternatively, one or more components of environment 200 may perform functions described as being performed by one or more other components of environment 200.

Figure 3:
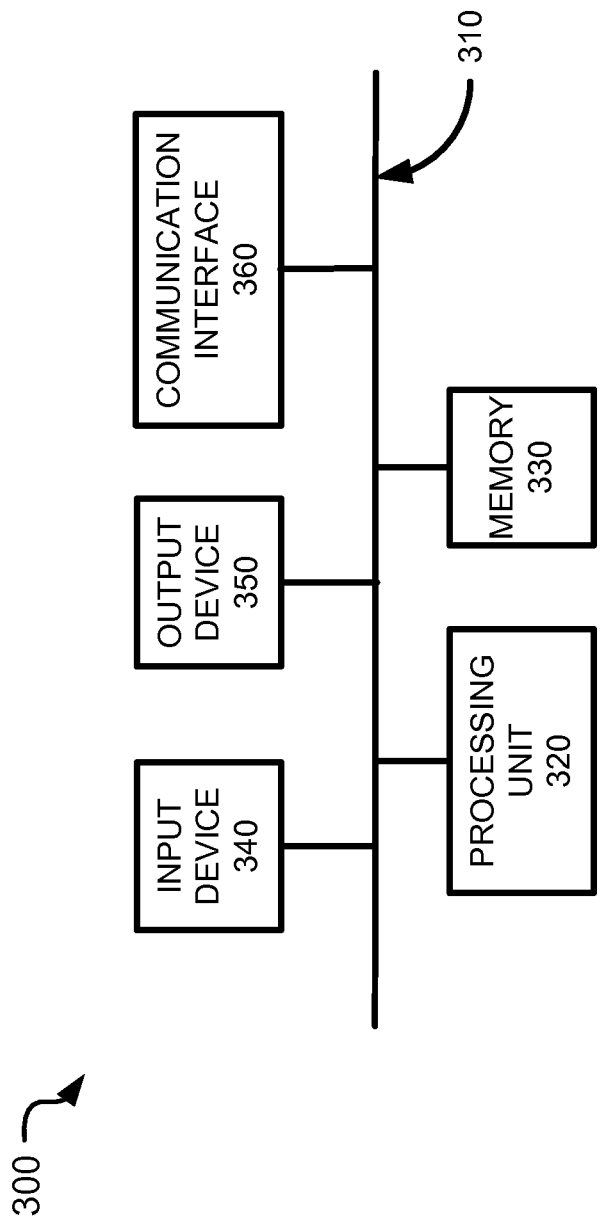
FIG. 3 is a diagram illustrating exemplary components of a device that may be included in the environment of FIG. 2.

FIG. 3 is a diagram illustrating exemplary components of device 300 according to an implementation described herein. User device 100, authentication device 210, image data device 220, portal device 230, and/or components of network 240 may each include one or more devices 300. As shown in FIG. 3, device 300 may include a bus 310, a processing unit 320, a memory 330, an input device 340, an output device 350, and a communication interface 360.

Bus 310 may include a path that permits communication among the components of device 300. Processing unit 320 may include any type of single-core processor, multi-core processor, microprocessor, latch-based processor, and/or processing logic (or families of processors, microprocessors, and/or processing logics) that interprets and executes instructions. In other embodiments, processing unit 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processing unit 320, and/or any type of non-volatile storage device that may store information for use by processing unit 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device (e.g., a touch screen display that functions as both input device 340 and output device 350). For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

Device 300 may perform certain operations in response to processing unit 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than those depicted in FIG. 3. Additionally or alternatively, one or more components of device 300 may perform one or more tasks described as being performed by one or more other components of device 300.

Figure 4:
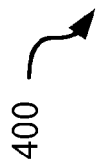
FIG. 4 is a table illustrating exemplary image data that may be accessed and stored by a component included in the environment of FIG. 1.

FIG. 4 shows an exemplary table 400 that includes data that may be stored in and/or accessed by image data device 220 (e.g., as image data 202) in one implementation. As shown in FIG. 4, table 400 may include, for example, an image identifier column 410, a file metadata column 420, and/or a subject metadata column 430. In table 400, data included in entries in a row may be associated with a same image (e.g., an image associated with first image identifier 410-A may be associated with first file metadata 420-A and first subject metadata 430-A and an image associated with second image identifier 410-B may be associated with second file metadata 420-B and second subject metadata 430-B).

Image identifier column 410 may include information, such as an alphanumeric character string or other designator, identifying an image. If an entry in image identifier column 410 relates to a file, the entry may include information identifying contents and/or a storage location associated with the file and may further include information, such as an encoding scheme or an application associated with the file. If an entry in image identifier column 410 corresponds to code (e.g., a Javascript, hypertext markup language (HTML), or extensible markup language (XML) expression that may be executed by user device 100 to determine a corresponding image) the entry may include information identifying a function, data manipulated within the code, and/or the code sections. If an entry in image identifier column 410 corresponds to a link, the entry may include information identifying a webpage, host, and/or a description of data accessed via the link.

File metadata column 420 may store metadata associated with an image identified in image identifier column 410. For example, an entry in file metadata column 420 may store information indicating a time, a place, or device used to capture an image. In another example, an entry in file metadata column 420 may store information identifying a format, encoding scheme, decryption data, or other technical attribute associated with an image. In another example, an entry in file metadata column 420 may store information identifying a storage location, source, or other data identifying how an image is obtained.

Subject metadata column 430 may store metadata associated with a subject captured in an image identified by image identifier column 410. For example, an entry in subject metadata column 430 may store information identifying a person, object, or place depicted in the image. In another example, an entry in subject metadata column 430 may store additional information associated with the subject, such as residence, occupation, or other biographical information for a person depicted in an image. In yet another example, an entry in subject metadata column 430 may store information identifying a relationship between the subject and a user of user device 100.

Although FIG. 4 shows exemplary data stored in table 400, in other implementations, table 400 may include fewer, different, differently arranged, or additional columns and rows than those depicted in FIG. 4. Additionally or alternatively, one or more columns and/or rows of table 400 may store data described as being stored by one or more other columns/rows of table 400.

FIG. 5 is a flowchart of a process 500 for performing an image-based authentication of user according to an implementation described herein. In some implementations, process 500 may be performed by user device 100. In other implementations, some or all of process 500 may be performed by another device or a group of devices separate from and/or including user device 100, such as authentication device 210, image data device 220 and/or portal device 230.

As shown in FIG. 5, process 500 may include determining whether to perform an image-based or a personal identification number (PIN)-based identification (block 510), and requesting a PIN (block 515) if PIN-based identification is selected (block 510-PIN). For example, user device 100 may use the image-based authentication if user device 100 corresponds to a kiosk or other type of device that does not include a keyboard or other input device to enable a user to input a pin. Requesting and evaluating a PIN in block 515 may include receiving a numerical sequence of a particular length and determining whether the received numerical sequence matches a stored number associated with user device 100.

Continuing with FIG. 5, if the image-based identification is selected (block 510-IMAGE), process 500 may include determining a desired authentication accuracy (block 520). In one example, the desired authentication accuracy may be determined based on authentication data 201 received from authentication device 210. For instance, authentication device 210 may direct user device 100 to use a first, lower authentication accuracy to enable the user to perform a less sensitive function, such accessing a public webpage, but the second, higher authentication accuracy (e.g., with a lower chance of being correctly guessed by an unauthorized user) before enabling the user to perform a sensitive function, such as accessing secure financial records or other confidential information.

Additionally or alternatively, user device 100 may determine a number of possible combinations associated with a corresponding PIN. In this example, if the PIN corresponds to a 6-digit numerical sequence in base-10 (a number between 0-9), a user has a $10^{-6}$ (0.0001%) likelihood of randomly guessing the PIN. In another example, if the PIN corresponds to a string of four alphabetic characters (letters A-Z), the user will have a $26^{-4}$ (0.0002%) likelihood of randomly guessing the string.

User device 100 may then acquire a number of correct images 122 and incorrect images 124 based on the desired authentication accuracy (block 530). For example, to achieve an authentication accuracy associated with a 6 digit numerical PIN (e.g., a $10^{-6}$ likelihood of randomly guessing the PIN), user device 100 may require a user to successful select from 20 pairs of correct images 122 and incorrect images 124 (e.g., the user has a $2^{-20}$ likelihood of randomly guessing the twenty correct images 122) to achieve a similar authentication accuracy. Consequently, user device 100, in this example, may obtain the twenty pairs of correct images 122 and incorrect images 124 in block 530. While user device 100 is described herein as providing pairs of correct images 122 and incorrect images 124, user device 100 may present other combinations of correct images 122 and incorrect images 124 to achieve the desired authentication accuracy. For example, if user device 100 presents a single correct image 122 in connection with nine incorrect images 124 (i.e., presenting 10 total images at time), a user will have a 1 out of 10 (10%) likelihood of randomly selecting the correct image 122, and this type of selection may be repeated to achieve a desired authentication accuracy. For example, six of such ten image authentication challenges may be used by user device 100 to achieve an authentication accuracy associated with a 6 digit PIN. In this way, a user may be authenticated with sufficient authentication accuracy and without the problem of PIN simplification in which users may select PINs that follow particular patterns (e.g., a PIN of "1234") or include repeated numbers, thereby significantly reducing the number of that numbers entered by an unauthorized user before correctly identifying the PIN.

To obtain correct images (or group of images) 122 and incorrect image (or group of images) 124 in block 530, user device 100 may interface with image data device 220 to obtain image data 202. Image data 202 may include correct images (or group of images) 122 and incorrect image (or group of images) 124 and/or may include information that enables user device 100 to obtain correct image (or group of images) 122 and incorrect image (or group of images) 124. For example, image data 202 may include information identifying one or more attributes (e.g., identifying a subject, employer, location, etc. associated with a subject), and user device 100 may collect correct image (or group of images) 122 that match the attributes and incorrect image (or group of images)) 124 that do not match the attributes.

As further shown in FIG. 5, process 500 may include user device 100 presenting correct image(s) 122, incorrect image(s) 124, and selection instructions 126 (block 540). For example, user device 100 may use the attribute(s) associated with correct image (or group of images) 122 to generate selection instructions 126. Display 120 may present correct image(s) 122, incorrect image(s) 124, and selection instructions 126. User device 100 may receive a user selection from the displayed correct image (or group of images) 122 and/or incorrect image (or group of images) 124 (block 550), and may determine whether the user selected a correct image (or group of images) 122 (block 560).

If the user did not select correct image 122 (block 560-NO), user device 100 may determine whether the user has selected more than a threshold number of incorrect images 124 (block 570). The threshold may be a fixed quantity (e.g., three) or may be determined dynamically. For example, the threshold quantity of incorrect selections may correspond to a quantity that would make it impossible and/or inconvenient to achieve the desired authentication accuracy. For example, after the user has made a particular number of incorrect selections (e.g., more than 2), user device 100 may require more than a threshold number of correct selections before the desired authenticity accuracy can be achieved. For example, user device 100 may maintain an incorrect selection counter that is incremented when incorrect image 124 is selected, and user device 100 may determine whether the counter exceeds a threshold quantity of incorrect selections.

If the user has selected more than a threshold number of incorrect images 124, such as when an incorrect selection counter exceeds a threshold number (block 570 YES), user device 100 may deny authentication of the user (block 575) and, correspondingly, deny any requested access. For example, user device 100 may indicate to portal device 230 that the user is not authenticated to access an associated application, service, and/or data. If the user has selected less than a threshold number of incorrect images 124 (block 570-NO), user device 100 may return to block 530 to acquire different images and/or to block 550 receive another user selection.

If the user selected correct image 122 (block 560-YES), user device 100 may determine whether the user has selected a sufficient number of correct images 122 to achieve the desired authentication accuracy (block 580). For example, user device 100 may maintain a correct selection counter, and may increment this counter when correct image 122 is selected (block 560-YES) and decrement this counter when incorrect image 124 is selected (block 560-NO). User device 100 may determine that desired authentication accuracy is achieved when the correct selection counter reaches a particular value. If the desired authentication accuracy is achieved (block 580-YES), user device 100 may allow the user to access services, applications, and/or data (block 590). For example, user device 100 may indicate to portal device 230 via access request 203 that the user is authenticated. If the desired authentication accuracy is not achieved (block 580-NO), user device 100 may return to block 530 to acquire different images and to present and to receive additional user selection(s).

FIG. 6 is a flowchart of a process 600 for acquiring correct image (or group of images) 122 and incorrect (or group of images) 124 in block 530 according to an implementation described herein. In some implementations, process 600 may be performed by user device 100. In other implementations, some or all of process 600 may be performed by another device or a group of devices separate from and/or including user device 100, such as image data device 220.

As shown in FIG. 6, process 600 may include receiving correct image (or group of images) 122 (block 610). For example, user device 100 may obtain image data 202 from image data device 220 that includes a particular correct image 122 or data (e.g., a storage address) that enables user device 100 to obtain the particular correct image 122. In one implementation, user device 100 may obtain correct image (or group of images) 122 associated with the user. For example, user device 100 may access images captured and/or stored on user devices 100, images associated with the user's contact list, images accessed via cloud-based storage (not shown) associated with the user, a social-media website, etc. In another example, user device 100 may obtain correct images 122 based on one or more selection criteria previously received from the user and/or selection criteria dynamically determined based on other activities by the user. For example, if the user is determined (e.g., based on the user's browser history, messages, documents, etc.) to be a fan of a particular entertainer and/or sports team, user device 100 may obtain, as correct image (or group of images) 122, images associated with the entertainer or sports team. In some implementations, a user associated with user device 100 may select and/or upload correct image 122 to be used and/or may approve a correct image 122 to be used for authentication purposes After receiving correct image (or group of images) 122, user device 100 may determine an attribute associated with correct image (or group of images) 122 (block 620). In one implementation, user device 100 may analyze a file storing correct image 122 to extract metadata associated with correct image 122. For example, user device 100 may extract, from the file, a place and/or time when correct image 122 was collected. In another implementation, user device 100 may use various image processing techniques on correct image 122 to identify an associated subject. For example, user device 100 may perform facial recognition to identify a person included in correct image 122. Additionally or alternatively, user device 100 may analyze shapes, colors, light intensity, etc. to identify the person, a location, and/or an object represented in correct image 122. In another implementation, user device 100 may object additional metadata based on information extracted from or determined based on correct image 122. For example, user device 100 may use a subject identifier extracted from correct image 122 to collect (e.g., using an internet search engine or other data source) additional information regarding the subject. For example, an identifier associated with a person may be used to identify contact information or an address associated with the person. In still other instances, the user associated with user device 100 may provide the metadata, such as a nickname of a person, etc.

As shown in FIG. 6, process 600 may further include identifying incorrect image (or group of images) 124 based on the attribute(s) associated with correct image 122 (block 630). For example, user device 100 may interact with image data device 220 to obtain, as image data 202, incorrect image (or group of images) 124 that do not share the attribute(s) associated with correct image 122. For example, user device 100 and/or image data device 220 may obtain images from the Internet, social media, publicly available repositories, etc. that are unfamiliar to the user and that are used by user device 100 as incorrect images 124. In certain implementations, user device 100 and/or with image data device 220 may analyze correct image 122 to identify one or more features that differ from an attribute for selection instructions 126, and user device 100 and/or with image data device 220 may use the features to identify incorrect image (or group of images) 124. For example, if correct image 122 is associated with a particular subject, user device 100 and/or with image data device 220 may identify incorrect images 124 that depict different subjects of similar age, ethnicity, sex, pose, clothing, hairstyle, etc.

Continuing with FIG. 6, process 600 may also further include generating image selection instructions 126 based on the attribute(s) associated with correct image 122 (block 640). For example, user device 100 may generate selection instructions 126 that direct a user to select (from a display 120 presenting correct image (or group of images) 122 and incorrect image (or group of images) 124) an image having the identified attribute. If display 120 presents multiple correct images 122, instructions 126 may further include an indication of an order that the user should select from among correct images 122. For example, instructions 126 may direct the user to select from correct images 122 in an order based on an attribute (e.g., an age) associated with subjects of a correct group of images 122. In another example, instructions 126 may identify respective attributes associated with a correct group of images 122 and may direct the user to select from correct group of images 122 in an order based on the respective attributes. For example, if correct group of images 122 correspond to members of sports team, instructions 126 may direct the user to select correct group of images 122 in an order based on positions played by the members.

FIGS. 7A-7E illustrate exemplary displays 700-A through 700-E (referred to individually as display 700 and collectively as displays 700) that may be presented by user device 100 according to implementations described herein. As shown in FIGS. 7A-7E, each of displays 700-A through 700-E may present correct image (or group of images) 122, incorrect image (or group of images) 124, and instructions 126 (shown in FIGS. 7A-7E as instructions 126-A through 126-E).

As shown in FIG. 7A, display 700-A may include instructions 126-A that direct the user to select, as correct image 122, an image depicting a particular subject (e.g., a person, place, or object). In one implementation, instructions 126-A may include information (e.g., a name) identifying a particular subject, an attribute (e.g., an age, residence, occupation, etc.) associated with the subject, a relationship of the subject to a user of user device, a category of the subject, etc. For instance, instructions may direct the user to select correct image 122 that presents one or more subjects that have a common characteristic, such as an image showing subjects who are relatives of the user.

For example, if correct image 122 and incorrect image 124 are collected from a contact list associated with the user, instruction 126-A may direct the user to select a subject having a particular relationship to the user, as defined in the contact list. In this example, instruction 126-A may direct the user to identify correct image 122 depicting a relative, friend, co-worker, classmate, neighbor, etc., and this relationship may be determined based on the contact list.

In another example, user device 100 may collect and/or determine additional information associated with the subject of correct image 122 and may form instructions 126 based on the additional information. For example, user device 100 may interface with a search engine or a data repository using an identity of the subject to determine the additional information regarding the subject. For example, correct image 122 may be associated with a subject having a particular name, user device 100 may search for additional information associated with the subject, such as the subject's residence, and may generate instructions 126 based on this additional information.

In yet another example, instruction 126-A may direct the user to identify correct image 122 based on an interest or hobby associated with the user. For example, if user device 100 determines (e.g., based the user's browsing history, multimedia content viewed via user device 100, messages exchanged via user deice 100, or other user activities) that the user is a fan of a particular sports team, instructions 126-A may direct the user to select correct image 122 depicting a player or mascot on the user's favorite sports team. Similarly, if user device 100 determines that the user has a particular hobby, instructions 126-A may direct the user to select correct image 122 depicting a person, place, or object associated with the hobby. For instance, if user device 100 determines that the user is interested in woodworking, instructions 126-A may direct the user to select correct image 122 depicting a tool that would be used to shape wood or perform some other woodworking function.

As shown in FIG. 7B, display 700-B may include instructions 126-B that direct the user to select, as correct image 122, an image having particular metadata associated with the image (e.g., data identifying when, where, or how the image was collected and/or stored). The metadata may be determined based on data included in or associated with a file storing correct image 122.

For example, both correct image 122 and incorrect image 124 may include representations of a common subject, and instructions 126-B may direct the user to identify the particular image captured on a particular date or place (e.g., the user's vacation home) or captured by a particular imaging device associated with correct image 122.

In another example, instructions 126-B may direct the user to select correct image 122 associated with an activity performed by the user. For instance, if the user previously viewed multimedia content (e.g., a movie or television show) or reads text (e.g., newspapers, magazines, etc.) via user device 100, instructions 126-B may direct the user to select correct image 122 associated with a portion of the multimedia content or text. For example, user device 100 may receive information identifying content viewed by the user via another device (e.g., a set-top box not shown in FIG. 1 or 2). Similarly, if the user viewed a recipe via user device 100, instructions 126-A may direct the user to select correct image 122 associated with an ingredient used in the recipe.

In another example, user device 100 may analyze prior communications exchanged via user device 100 and may generate instructions 126-B based on the prior communications. For example, instructions 126-B may direct the user to identify a contact with whom the user spoke and/or exchanged a message during a particular time period.

Figures 7C, 7D:
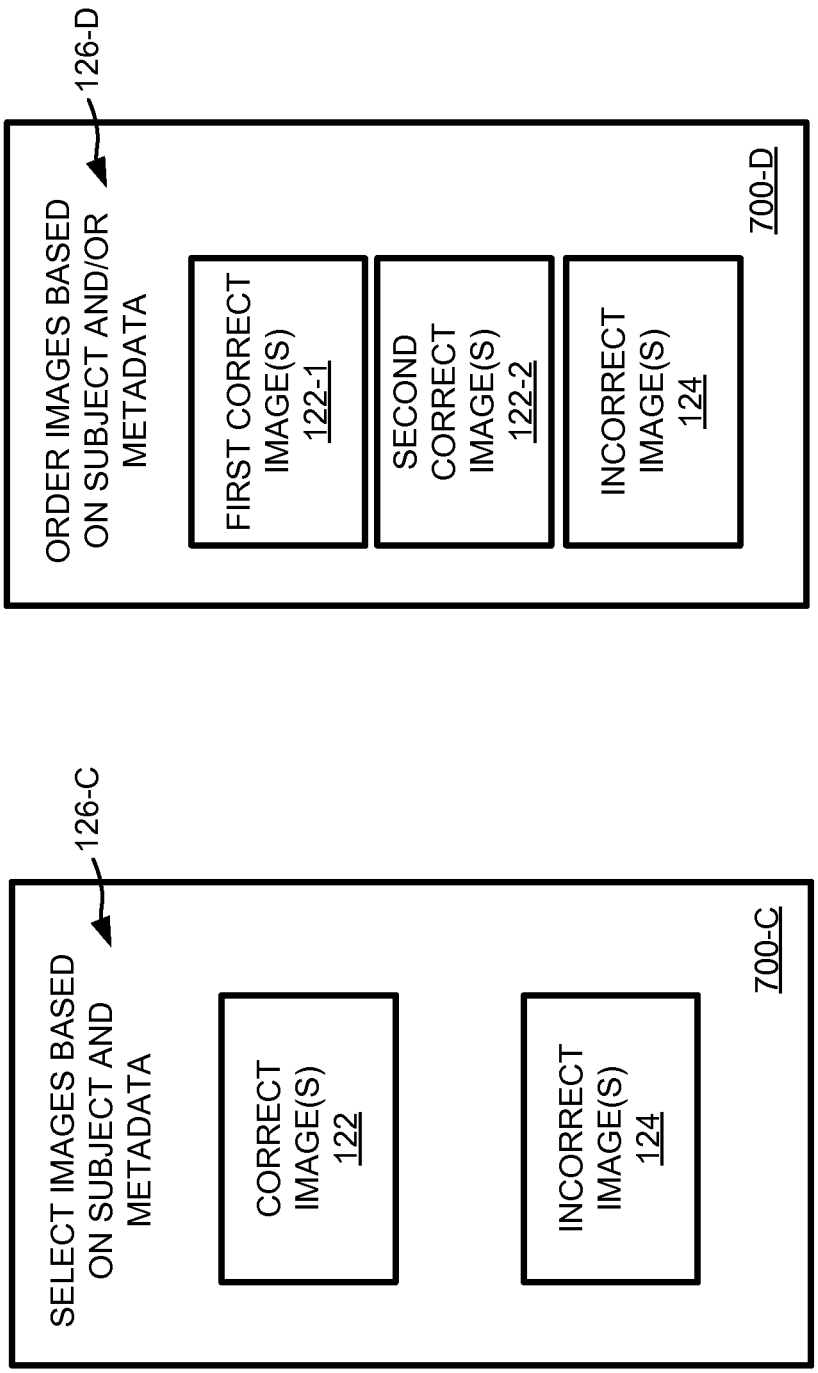

As shown in FIG. 7C, display 700-C may include instructions 126-C that direct the user to identify correct image 122 that captures a particular subject and is associated with particular metadata. For example, instructions 126-C may direct the user to select, as correct image 122, an image associated with particular co-worker and taken at a particular time.

As shown in FIG. 7D, display 700-D may include instructions 126-D that direct the user to select multiple correct images 122 in a particular order. For example, instructions 126-D may direct the user to select from correct images 122 in an alphabetical order based on the names of the subjects appearing in the correct images 122. In another example, instructions 126-D may direct the user to select from correct images 122 in an order based on the locations of the subjects appearing in the correct images 122 (e.g., select the images based on locations of the subject in an East-to-West order). In yet another example, instructions 126-D may direct the user to select from correct images 122 showing a common subject (e.g., the same person) in a date order so that older pictures of the subject should be selected before newer pictures of the subject.

Figure 7E:
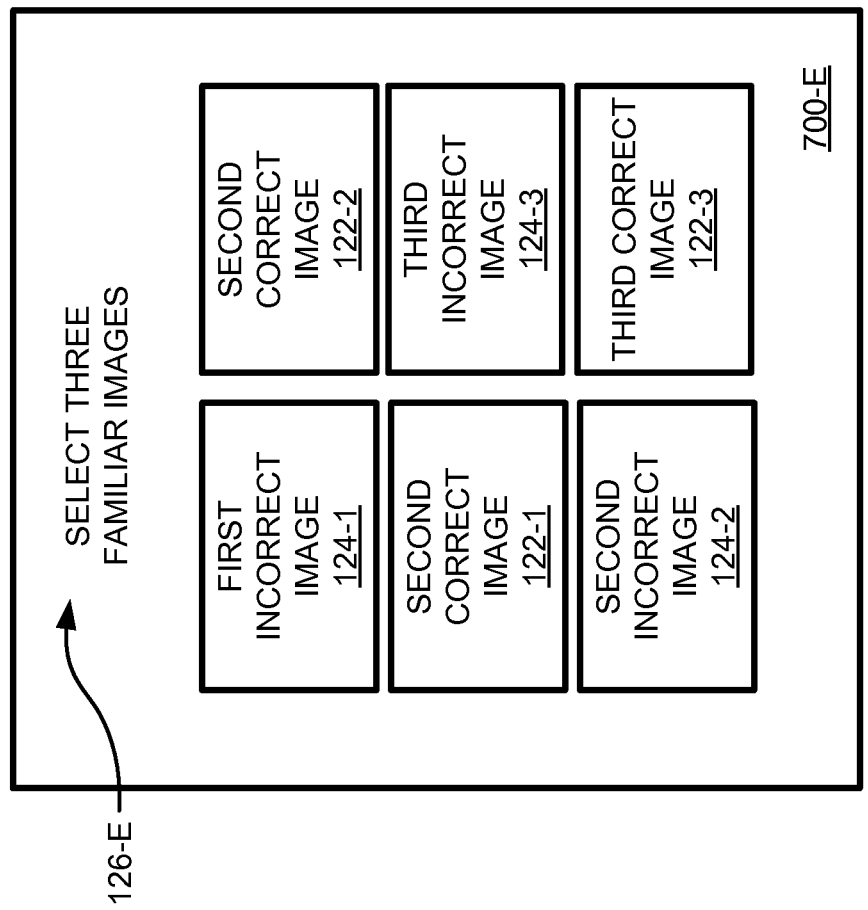

As shown in FIG. 7E, display 700-E may include instructions 126-E that direct the user to select three images (out of six total displayed images) that are familiar to the user. For example, instructions 126-E may direct the user to select from correct images 122-1 through 122-3 that show family members associated with the user of user device 100. In this example, three correct images 122-1 through 122-3 and three incorrect images 124-1 through 124-3 are randomly distributed through display 700-E. In general, the likelihood of an unauthorized user correctly guessing a quantity of correct images 122 ($N^{Correct}$) displayed in connection with a quantity of incorrect images 124 ($N^{Incorrect}$) may be determined based on $(N^{Correct}! * N^{Incorrect}!) \div (N^{Correct} + N^{Incorrect})!$. In the example shown in FIG. 7E, the likelihood of an unauthorized user correctly guessing the three correct images 122-1 through 122-3 are given $3!*3! \div 6!$, which equals 1/20 (or 0.05).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, the number of correct and/or incorrect images display at a time may be selected based on a size and/or resolution of a display device. For example, a small screen device, such as a smart watch, may present a single correct image and a single incorrect image, whereas a large, high-resolution television display may present a single correct image in connection with a relatively larger number (e.g., 99) of incorrect images. The number of image-based challenges (or trials) may then vary based on the displayed number of correct and/or incorrect images such that a desired security level is achieved. For example, to achieve a $10^{-6}$ probability of correcting guessing a set of correct image (corresponding to six-digit PIN), a user would need to provide twenty (20) correct selections from the small display showing pairs of incorrect and correct images (since $2^{-20}=0.9*10^{-6}$), whereas user would need to provide three correct selections from the larger display that presents a signal correct image in connection with 99 incorrect images (since $100^{-3}=10^{-6}$).

The specification and drawings are accordingly to be regarded in an illustrative rather than restrictive sense. For example, while series of blocks have been described with respect to processes 500 and 600 in FIGS. 5 and 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code, it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at a processor and from an authentication device, an indication of a desired authentication accuracy and a first token that enables a user device to obtain image data from an image data device;
   obtaining, by the processor, from the image data device and based on receiving the first token, a plurality of images, wherein the plurality of images includes a first correct image, a second correct image, a first incorrect image, and a second incorrect image, wherein the; first correct image and the second correct image include images of people obtained from a contact list associated with a user of the user device, and wherein the first incorrect image and the second incorrect image include images of people that are not in the contact list associated with the user;
   presenting, by the processor, a first subset of the plurality of images for display, wherein the first subset includes the first correct image and the first incorrect image;
   presenting, by the processor, selection instructions, wherein the selection instructions include an identifier associated the first correct image and instructions to choose and image associated with the identifier, wherein the identifier includes a name of a person in the first correct image;
   receiving, by the processor, a first input by a user and from the first subset, wherein the first input selects one of the first correct image or the first incorrect image;
   incrementing, by the processor, a correct selection count associated with the user when the first input selects the first correct image, wherein the user is determined to be authenticated when the correct selection count meets a first threshold;
   incrementing, by the processor, an incorrect selection count associated with the user when the first input selects the first incorrect image, wherein the user is determined to not be authenticated when the incorrect selection count meets a second threshold;
   presenting, by the processor, a second subset of the plurality of images for display when the first input selects the first correct image and the correct selection count does not meet the first threshold or when the first input selects the first incorrect image and the incorrect selection count does not meet the second threshold, wherein the second subset includes the second correct image and the second incorrect image;

receiving, by the processor, a second input by the user and from the second subset, wherein the second input selects one of the second correct images or the second incorrect image;

determining, by the processor, whether the user is authenticated based on the second input and the desired authentication accuracy;

receiving, by the processor and from the authentication device, a second token to generate a request for access to a portal device when the user is authenticated; and transmitting, by the processor and to the portal device when the user is authenticated, an indication that the user is authenticated and the request for access, wherein the portal device allows the user to access particular data based on the indication.

2. The method of claim 1,
wherein the identifier associated with the first correct image further includes an attribute associated with the first correct image.

3. The method of claim 2, wherein the attribute includes at least one of:
data associated with a subject of the first correct image, or
metadata associated with the first correct image.

4. The method of claim 1, wherein obtaining the plurality of images includes:
receiving the first correct image;
identifying an attribute associated with the first correct image; and
obtaining the first incorrect image based on the attribute, wherein the first incorrect image is not associated with the attribute.

5. The method of claim 4,
wherein the selection instructions identify the attribute associated with the first correct image.

6. The method of claim 2, wherein the attribute includes a relationship with the user.

7. The method of claim 1, further comprising:
determining an authentication accuracy for a personal identification number (PIN) associated with the user, wherein the authentication accuracy corresponds to likelihood of randomly selecting the PIN from a group of numbers; and
calculating the first threshold based on the authentication accuracy.

8. A device comprising:
a memory configured to store a plurality of images associated with a user, wherein the plurality of images includes a first correct image, a second correct image, a first incorrect image, and a second incorrect image, wherein the first correct image and the second correct image include images of people obtained from a contact list associated with the user, and wherein the first incorrect image and the second incorrect image include images of people that are not in the contact list associated with the user; and
a processor configured to:
receive, from and authentication device, and indication of a desired authentication of a desired authentication accuracy and a first token that enables the device to obtain image data;
present, in response to receiving the first token, a first subset of the plurality of images for display, wherein the first subset includes the first correct image and the first incorrect image,
present selection instructions, wherein the selection instructions include an identifier associated with the first correct image and instructions to choose and image associated with the identifier, wherein the identifier includes a name of a person in the first correct image,
receive a first input by the user and from the first subset, wherein the first input selects one of the first correct image or the first incorrect image,
increment a correct selection count associated with the user when the first input selects the first correct image, wherein the user is determined to be authenticated when the correct selection count meets a first threshold,
increment an incorrect selection count associated with the user when the first input selects the first incorrect image, wherein the user is determined to not be authenticated when the incorrect selection count meets a second threshold,
present, for display, a second subset of the plurality of images when the first input selects the first correct image and the correct selection count does not meet the first threshold or when the first input selects the first incorrect image and the incorrect selection count does not meet the second threshold, wherein the second subset includes the second correct image and the second incorrect image,
receive a second input by the user and from the second subset, wherein the second input selects one of the second correct image or the second incorrect image,
determine whether the user is authenticated based on the second input and the desired authentication accuracy,
receive, from the authentication device, a second token to generate a request for access to a portal device when the user is authenticated, and
transmit, to the portal device when the user is authenticated, and indication that the user is authenticated and the request for access, wherein the user is able to access particular data based on the indication.

9. The device of claim 8, wherein the selection instructions identify an attribute associated with the first correct image.

10. The device of claim 9, wherein the attribute includes at least one of:
data associated with a subject of the first correct image, or
metadata associated with the first correct image.

11. The device of claim 8, wherein the processor is further configured to:
identify an attribute associated with the first correct image; and
obtain the first incorrect image based on the attribute, wherein the first incorrect image is not associated with the attribute.

12. The device of claim 11, wherein the selection instructions identify the attribute associated with the first correct image.

13. The device of claim 9, wherein the attribute includes a relationship with the user.

14. The device of claim 8, wherein the processor is further configured to:
determine an authentication accuracy for a personal identification number (PIN) associated with the user, wherein the authentication accuracy corresponds to likelihood of randomly selecting the PIN from a group of numbers, and
calculate the first threshold based on the authentication accuracy.

15. A non-transitory computer-readable medium configured to store instruction, the instructions comprising:

one or more instructions that, when executed by a processor associated with a device, cause the processor to:
receive, from an authenticated device, and indication of a desired authentication accuracy and a first token that enables the device to obtain image data from and image data device;
obtain, based on receiving the first token, a plurality of images from the image data device, wherein the plurality of images includes a first correct image, a second correct image, a first incorrect image, and a second incorrect image, wherein the first correct image and the second correct image include images of people obtained from a contact list associated with a user, and wherein the first incorrect image and the second incorrect image include images of people that are not in the contact list associated with the user;
present a first subset of the plurality of images for display, wherein the first subset includes the first correct image and the first incorrect image;
present selection instructions, wherein the selection instructions include an identifier associated the first correct image and instructions to choose an image associated with the identifier, wherein the identifier includes a name of a person in the first correct image;
receive a first input by a user and from the first subset, wherein the first input identifies one of the first correct image or the first incorrect image;
increment a correct selection count associated with the user when the first input selects the first correct image, wherein the user is determined to be authenticated when the correct selection count meets a threshold;
present a second subset of the plurality of images for display when the first input selects the first correct image and the correct selection count does not meet the threshold or when the first input selects the first incorrect image, wherein the second subset includes the second correct image and the second incorrect image;
receive a second input by the user and from the second subset, wherein the second input selects one of the second correct image or the second incorrect image;
determine whether the user is authenticated based on the second input and the desired authentication accuracy;
receive, from the authentication device, a second token to generate a request for access to a portal device when the user is authenticated; and
transmit, to the portal device when the user is authenticated, in indication that the user is authenticated and the request for access, wherein the user is able to access particular data based on the indication.

16. The non-transitory computer-readable medium of claim 15, wherein the selection instructions identify an attribute associated with the first correct image.

17. The non-transitory computer-readable medium of claim 16, wherein the attribute includes at least one of:
data associated with a subject of the first correct image, or
metadata associated with the first correct image.

18. The non-transitory computer-readable medium of claim 15, wherein the one or more instructions, when causing the processor to obtain the plurality of images, further cause the processor to:
identify an attribute associated with the first correct image; and
obtain the first incorrect image based on the attribute, wherein the first incorrect image is not associated with the attribute.

19. The non-transitory computer-readable medium of claim 18, wherein the selection instructions identify an attribute associated with the first correct image.

20. The non-transitory computer-readable medium of claim 15, wherein the first correct image includes a plurality of first correct images, wherein the first input includes a plurality of first inputs, wherein each of the plurality of first inputs identifies one of the plurality of first correct images or the first incorrect image, and wherein the one or more instructions, when incrementing the correct selection count, further cause the processor to:
increment the correct selection count when the plurality of first inputs selects the plurality of first correct images.

* * * * *